US 9,146,126 B2

(12) United States Patent
Stroila et al.

(10) Patent No.: US 9,146,126 B2
(45) Date of Patent: Sep. 29, 2015

(54) INTERACTIVE GEOGRAPHIC FEATURE

(75) Inventors: Matei Stroila, Chicago, IL (US); James D. Lynch, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 72 days.

(21) Appl. No.: 13/014,977

(22) Filed: Jan. 27, 2011

(65) Prior Publication Data

US 2012/0197713 A1 Aug. 2, 2012

(51) Int. Cl.
*G01C 21/00* (2006.01)
*G01C 21/36* (2006.01)
*G06Q 30/02* (2012.01)

(52) U.S. Cl.
CPC ........ *G01C 21/3638* (2013.01); *G01C 21/3614* (2013.01); *G01C 21/3676* (2013.01); *G01C 21/3682* (2013.01); *G06Q 30/0251* (2013.01)

(58) Field of Classification Search
CPC ........... G06Q 30/0251; G06Q 30/0601; G06F 3/0481; G06F 3/048; G06F 3/0484; G01C 21/00
USPC ............ 701/200, 400, 533; 705/14.53, 14.49; 715/764
See application file for complete search history.

(56) References Cited

U.S. PATENT DOCUMENTS

| | | | |
|---|---|---|---|
| 6,453,056 B2 * | 9/2002 | Laumeyer et al. ............ 382/104 |
| 7,149,626 B1 | 12/2006 | Devries et al. | |
| 7,542,846 B2 | 6/2009 | Motoyama et al. | |
| 7,805,306 B2 * | 9/2010 | Mitsui ............................ 704/258 |
| 8,027,514 B2 * | 9/2011 | Takaki et al. .................. 382/103 |
| 8,027,784 B2 * | 9/2011 | Geelen .......................... 701/437 |
| 8,406,994 B1 * | 3/2013 | Pu et al. ......................... 701/408 |
| 2002/0188400 A1 * | 12/2002 | Sato et al. ...................... 701/212 |
| 2004/0066316 A1 * | 4/2004 | Ogawa ....................... 340/995.1 |
| 2005/0102102 A1 * | 5/2005 | Linn .............................. 701/210 |
| 2007/0078596 A1 * | 4/2007 | Grace ............................ 701/209 |
| 2007/0192020 A1 * | 8/2007 | Brulle-Drews et al. ........ 701/200 |
| 2008/0189033 A1 * | 8/2008 | Geelen et al. ................. 701/209 |
| 2008/0215236 A1 * | 9/2008 | Deurwaarder et al. ....... 701/202 |
| 2008/0221786 A1 | 9/2008 | Otsuki | |
| 2009/0055093 A1 | 2/2009 | Hamilton et al. | |
| 2009/0125234 A1 * | 5/2009 | Geelen et al. ................. 701/209 |
| 2009/0172527 A1 * | 7/2009 | Buecker et al. ............... 715/700 |

(Continued)

FOREIGN PATENT DOCUMENTS

EP 1 912 196 A1 4/2008

OTHER PUBLICATIONS

"Navigon 7100 Review." GPS magazine, Dec. 1, 2007 (4 pages). http://www.gpsmagazine.com/2007/12/navigon_7100_review.php?page=4 (viewed on Jan. 27, 2011).

(Continued)

*Primary Examiner* — Helal A Algahaim
*Assistant Examiner* — Shardul Patel
(74) *Attorney, Agent, or Firm* — Lempia Summerfield Katz LLC

(57) ABSTRACT

One or more systems, devices, and/or methods for providing and/or using a navigation/geographic feature are disclosed. For example, a method of operation of a navigation system may include providing a graphics user interface. A data representation of a geographic object, such as a path sign or icon, text, or character thereof, is provided in the graphics user interface. The data representation of the path sign may be provided as a feature of a navigation display. Input identifying a portion of the data representation of the geographic object is received. A navigation-related function is provided based on receiving the input.

26 Claims, 5 Drawing Sheets

(56) References Cited

U.S. PATENT DOCUMENTS

| | | |
|---|---|---|
| 2009/0177396 A1 | 7/2009 | Thomassen |
| 2009/0281723 A1* | 11/2009 | Kurata .......................... 701/207 |
| 2010/0063722 A1 | 3/2010 | Yoshikawa |
| 2010/0094539 A1* | 4/2010 | Tomizawa .................... 701/201 |
| 2010/0207787 A1* | 8/2010 | Catten et al. ................. 340/905 |
| 2010/0268453 A1* | 10/2010 | Otani et al. .................. 701/201 |
| 2010/0328316 A1 | 12/2010 | Stroila et al. |
| 2010/0329504 A1* | 12/2010 | Chen ............................ 382/100 |
| 2011/0082640 A1* | 4/2011 | Bohme et al. ................ 701/201 |
| 2011/0144902 A1* | 6/2011 | Forte et al. ................... 701/201 |
| 2011/0159858 A1* | 6/2011 | Yu et al. ..................... 455/414.4 |
| 2011/0166775 A1* | 7/2011 | Takeuchi ...................... 701/201 |
| 2011/0219330 A1* | 9/2011 | Ando et al. ................... 715/784 |
| 2011/0288766 A1* | 11/2011 | Nagasawa et al. ............ 701/201 |
| 2011/0301831 A1* | 12/2011 | Setlur et al. .................. 701/200 |

OTHER PUBLICATIONS

European Search Report in European Patent Application No. EP 11195051.5-1236, dated May 18, 2012, 7 pages.

\* cited by examiner

INTERACTIVE GEOGRAPHIC FEATURE

BACKGROUND OF THE INVENTION

The present invention relates to geographic data, navigation, and/or graphics and, more particularly, to one or more geographical models, such as used for navigation-related functions.

As the days go by, buildings, streets, and other features to support human growth and travel continue to be constructed or provided. Also, existing infrastructure, roads, and other environments are being adapted to accommodate more people and traffic. Such growth and development affects how people go from one place to another and what they see during their journeys.

Navigation systems and/or devices are used to help people travel. For example, a navigation device may provide useful guidance or route information, such as providing a route from an origin to a desired destination. However, features, options, and/or tools for improving navigation experiences as well as providing different ways to interact with navigation features may be desired.

SUMMARY OF THE INVENTION

According to one aspect, a method of operation of a navigation system is provided. For example, the method includes providing a graphics user interface. A data representation of a geographic object, such as a path sign or icon, text, or character thereof, is provided in the graphics user interface. The data representation of the path sign may be provided as a feature of a navigation display. Input identifying a portion of the data representation of the geographic object is received. A navigation-related function is provided based on receiving the input.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
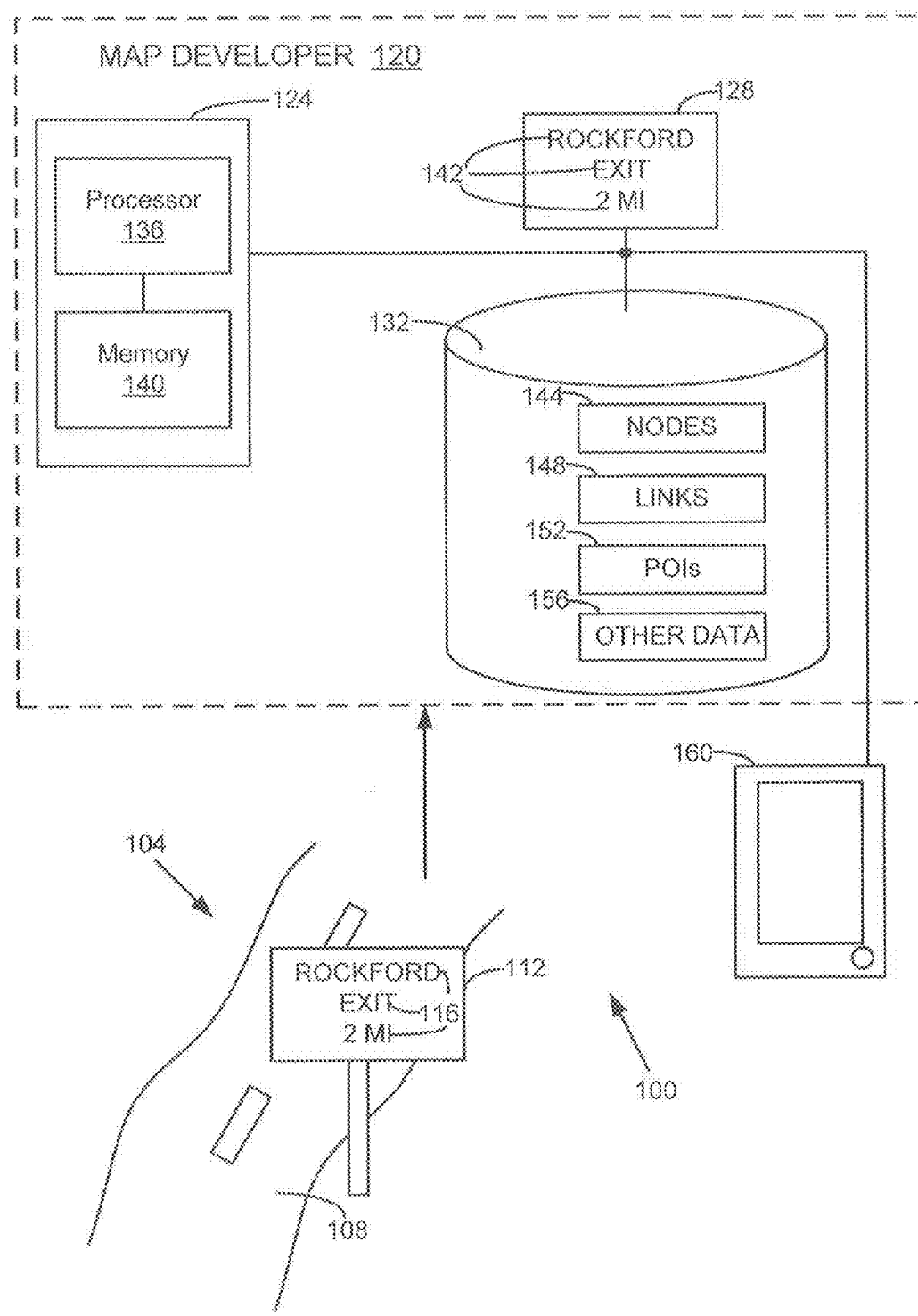
FIG. 1 is a diagram of an exemplary geographic and/or navigation data system.

FIG. 1 shows one embodiment of a geographic and/or navigation data system 100. The geographic data or navigation system 100 includes, but is not limited to, a geographic region 104, a processing device 124, a database 132, and/or a user device 160. Additional, fewer, or different components may be provided. For example, a proxy server, a name server, a map server, a cache server or cache network, a router, a switch or intelligent switch, additional computers or workstations, administrative components, a gateway device, a backbone, ports, network connections, and/or network interfaces may be provided. While some components in FIG. 1 are shown as separate from one another, one or more of these components may be combined, and, also, other components or features may be separated.

The geographic area 104 is a part of or is a city, a suburb, a state, a country, and/or other geographic region. For example, the geographic area 104 may be an area that includes a road or path network. In one embodiment, one or more roads or paths 108 pass through the geographic area 104. For example, the road 108 may be used to drive vehicles on, such as local and neighborhood streets as well as highways or interstates. Also, instead of or in addition to traditional streets, the road 108 may be one or more bicycle roads or paths, walking paths, or other travel paths or areas (such as an open space one may travel upon).

In one embodiment, a path or road sign 112 is present alongside the road 108. For example, the path sign 112 is a traffic sign, a traffic guide sign, an advertisement sign, geographic information sign, a local sign, an interstate sign, a highway or freeway sign, a road sign, and/or other sign. In one embodiment, the sign 112 is a traffic or road sign that provides information about a road exit or city exit. For example, the road sign 112 states, "ROCKFORD
EXIT
2 mi."

Such signs are used to inform travelers or drivers about upcoming cities/places (including points-of-interest ("POIs")), how to exit the road to such cities/places, distances, geographic features, traffic or road information, local information, and/or other information. For example, text 116 found in or on the road sign 112 corresponds to a city or place name (such as ROCKFORD), a geographic feature or maneuver (such as EXIT), and a distance (such as two miles). More or less information or other information may be provided in the text 116, and other markings or indications, such as symbols, may also be provided. In an alternative embodiment, the object 112 may be any other geographic object that provides information instead of or in addition to being a sign.

Information of or about the geographic area 104 may be collected and sent to a map, geographic, and/or navigation data developer 120, such as NAVTEQ North America, LLC located in Chicago, Ill. For example, image data, LIDAR data, position data (such as global positioning system ("GPS") data), and/or other data or information of the road sign 112 or associated surrounding area is captured. Other types of data, such as vehicle trace data, may also be collected. The data may be captured by collection vehicles equipped with one or more laser sensors, positioning systems, LIDAR components, video cameras, photo cameras, 360 degree rotating cameras, and/or other equipment. Alternatively, the data may be captured by one or more cell phones and/or cameras thereof.

The collected data (such as image, laser, LIDAR, text, dimension, color, texture, and/or position data of the road sign) is then sent to the map developer 120. For example, one or more hardware data storage media may be mailed to or brought to the map developer 120. Or, some or all of the collected data may be transmitted to the map developer 120 via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors. Further description and details on collecting geographic data and sending such data to a map developer may be provided in the United States Patent Application Publication U.S. 2010/0328316, entitled "GENERATING A GRAPHIC MODEL OF A GEOGRAPHIC OBJECT AND SYSTEMS THEREOF," which is hereby incorporated by reference.

One or more receiving and/or processing devices of the map developer 120 receive the collected or captured data. For example, the processing device 124 receives the collected data of the road sign 112 and/or other data. The processing device 124 is one or more servers, computers (such as a desktop tower or a laptop processing unit), workstations, processors, and/or other electronic processing systems or devices. The processing device 124 includes, but is not limited to, a processor 136 and a memory 140. Additional, fewer, or different components may be provided.

The processor 136 is a general processor, application-specific integrated circuit ("ASIC"), digital signal processor, field programmable gate array ("FPGA"), digital circuit, analog circuit, other processor, and/or combinations thereof. In one embodiment, the processor 136 is one or more processors operable to control and/or communicate with the various electronics and logic of the processing device 124 and/or other devices. The memory 140 is one or more of any known or future data storage devices. For example, the memory 140 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 140 may be part of the processor 136. The memory 140 is operable or configured to store laser, LIDAR, position, text, color, texture, dimension, and/or image data or other data.

The processor 136 or other processor is configured or adapted to execute one or more applications, which may be stored in the memory 140 or other memory. For example, an image software application may be used to generate a graphic(s) or graphical model or data representation of a road sign, other sign or geographic feature, and/or the geographic area or portions thereof based on at least the received collected data. In one embodiment, the processing device 124 analyzes the received image, laser, LIDAR, and/or other data, such as data corresponding to the sign 112, and generates a graphical data representation model 128. For example, optical character recognition ("OCR"), shape recognition, and/or other recognition techniques may be used on received data to determine or identify specific objects and features, such as a sign and contents thereof, for generating a graphical model and linking it and/or its contents with associated data, such as map data. Further description and details on generating a graphic model of a geographic object may be provided in the United States Patent Application Publication U.S. 2010/0328316, mentioned above.

The graphics model 128 is a vector based image model, such as a scalable vector graphics image ("SVG"). For example, the SVG model 128 and/or contents thereof are defined in extensible markup language ("XML") files, such as text files, which are graphically represented. Accordingly, the model 128 and/or contents thereof may be searched, indexed, scripted, manipulated, controlled, and/or edited. Alternatively, the graphics model 128 may be in any other image or data format. The data model 128 represents the real world sign 112. For example, the graphical model 128 includes data or attributes to represent a substantially similar shape, texture, color pattern or design, text (such as the text 116), symbol(s), arrangement, and/or other feature of the sign 112. In one embodiment, text 142 of the graphical model is selectable in an SVG or other vector graphics format. The model 128 may also include one or more symbols, characters, labels, videos, pictures, and/or other data or information that may be selectable. The different features or components of the model 128 may be all on a single SVG layer or they may be on separate multiple SVG layers forming a multi-layered SVG model. In an alternative embodiment, the model 128 may be in a raster image format having allocated bounding boxes for the separate features or components, which represent the different parts or features of the object 112. The different portions, components, text, symbols, layers, and/or other features of the model 128 may be linked or associated with geographic, navigation or map data, functions, and/or information.

For example, the generated graphical model 128 may be stored, associated with, and/or linked to the geographic database 132 or data thereof. In one embodiment, the geographic or map database 132 includes data used for (or configured to be compiled to be used for) navigation-related services. For example, the geographic database 132 includes node data records 144, road segment or link data records 148, POI data records 152, and other data records 156. More, fewer, or different data records may be provided. In one embodiment, the other data records 156 include cartographic ("carto") data records, routing data, and maneuver data. One or more portions, components, areas, layers, features, text, and/or symbols of the graphical model 128 may be stored in, linked to, and/or associated with one or more of these data records. For example, one or more portions of the model 128 may be matched with respective map or geographic records via position or GPS data associations (such as using known or future map matching or geo-coding techniques).

The link data records 148 are links or segments representing roads, streets, or paths. The node data records 144 are end points corresponding to the respective links or segments of the road segment data records 148. The road link data records 148 and the node data records 144 represent a road network, such as used by vehicles, cars, and/or other entities. Alternatively, the geographic database 132 contains path segment and node data records or other data that represent pedestrian paths or areas in addition to or instead of the vehicle road record data.

The road/link segments and nodes may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 132 may include data about the POIs and their respective locations in the POI data records 152. The geographic database 132 may also include data about places, such as cities, towns, or other communities, and other geographic features, such as bodies of water, mountain ranges, etc. Such place or feature data may be part of the POI data 152 or may be associated with POIs or POI data 152 (such as a data point used for displaying or representing a position of a city).

The geographic database 132 may be maintained by the map developer 120. The map developer 120 collects geographic data to generate and enhance the database 132. There are different ways used by the map developer 120 to collect data. These ways include obtaining data from other sources, such as municipalities or respective geographic authorities. In addition, the map developer may employ field personnel to travel by vehicle along roads throughout the geographic region to observe features and/or record information about them. Also, remote sensing, such as aerial or satellite photography, may be used.

The geographic database 132 may be a master geographic database stored in a format that facilitates updating, maintenance, and development. For example, the master geographic database 132 or data in the master geographic database 132 is in an Oracle spatial format or other spatial format, such as for development or production purposes. The Oracle spatial format or development/production database may be compiled into a delivery format, such as a GDF format. The data in the production and/or delivery formats may be compiled or further compiled to form geographic database products or databases, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received geographic database in a delivery format to produce one or more compiled navigation databases.

As mentioned above, the database 132 may be a master geographic database, but in alternate embodiments, the database may represent a compiled navigation database that may be used in or with end user devices to provided navigation-related functions. For example, the database 132 may be used with the end user device 160 to provide an end user with navigation features. In such a case, the database may be downloaded or stored on the end user device 160, or the end user device 160 may access the database 132 through a wireless or wired connection (such as via a server and/or network).

The end user device 160 is an in-vehicle navigation system, a personal navigation device ("PND"), a portable navigation device, a cellular telephone, a mobile phone, a personal digital assistant ("PDA"), a watch, a camera, a computer, and/or other device that can perform navigation-related functions, such as digital routing and map display. In one embodiment, the navigation device 160 is a cellular telephone, such as a cellular telephone provided by Nokia Corporation located in Espoo, Finland. An end user may use the device 160 for navigation functions such as guidance and map display. In one embodiment, the end user may view the graphical model 128 displayed on the user device 160. The graphical model 128 may be stored in the user device 160 or may be accessed via a wired or wireless connection. The graphical model 128 is displayed to provide navigation information or features to the end user (such as displaying the model 128 to provide directions or guidance along a route). The graphical model 128 or portions or components thereof are selectable or identifiable by the end user to provide additional or enhanced navigation features. For example, the graphical model 128 acts as an interactive geographic object/feature (such as an interactive sign) that provides for routing, highlighting, guidance, and/or other features/functions by being linked or associated with data in the geographic database 132.

Figure 2:
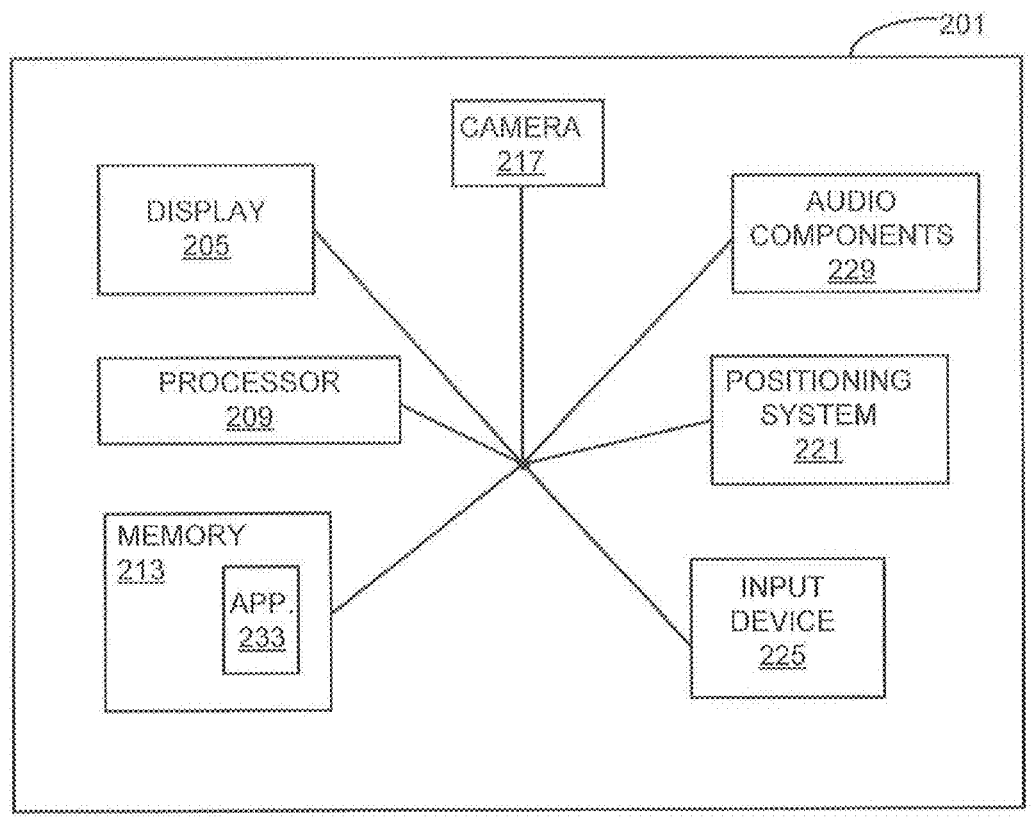
FIG. 2 illustrates an embodiment of a user device that may be used in the system of FIG. 1.

FIG. 2 illustrates an embodiment of a user device 201, which may be similar to or different than the user device 160. The device 201 includes, but is not limited to, a processor 209, a memory 213, a positioning system 221, a camera or camera device 217, a display 205, an input device 225, and audio components 229. Additional, fewer, or different components may be provided. For example, communication components may be provided. The communication components may be wireless transmitter and/or receiver components (such as an antenna and/or power amplifier), wired connections or ports, or other components for data communication. While some components in FIG. 2 are shown as separate from one another, one or more of these components may be combined, and some components may also be separated.

The processor 209 is similar to or different than the processor 136. The processor 209 is configured to operate and communicate with the other components of the end user device 201 or other device. The memory 213 is similar to or different than the memory 140. The memory 213 is operable or configured to store geographic or navigation data, graphic model data, and/or other data. For example, the memory 213 may store the geographic database 132, the graphical model 128, and/or portions thereof. Also, the memory 213 may include or store a software application 233 that runs navigation-related functions, such as an end user navigation application.

The positioning system 221 is a GPS system, one or more mechanical and/or electrical sensors, one or more gyroscopes, a local positioning system, one or more direction sensors, or other system or device for providing position data, such as location data (e.g., longitude, latitude, and/or altitude or other coordinates) and/or direction data, of the device 201 or components thereof. The camera 217 is one or more cameras used for taking pictures or videos of a surrounding area. For example, the camera system 217 includes a camera (e.g., including a lens and image capture components) that records video data (such as in the visible light spectrum) and/or may also capture still photographs separate from the video data.

The display 205 is any mechanical and/or electronic display positioned for accessible viewing in, on, or in communication with the device 201. For example, the display 205 is a touch screen, liquid crystal display ("LCD"), cathode ray tube ("CRT") display, light-emitting diode ("LED") display, a plasma display, and/or other display. The display 205 may act as a hardware implementation of a user interface or a portion thereof. The input device 225 may be one or more buttons, keypad, keyboard, mouse, stylist pen, trackball, rocker switch, touch pad, voice recognition circuit, or other device or component for controlling or inputting data in one or more of the components of the device 201. The audio components 229 may include one or more speakers, microphones, audio wires or connections, amplifiers, filters, receivers, headphone jacks, and/or other components.

Figure 3:
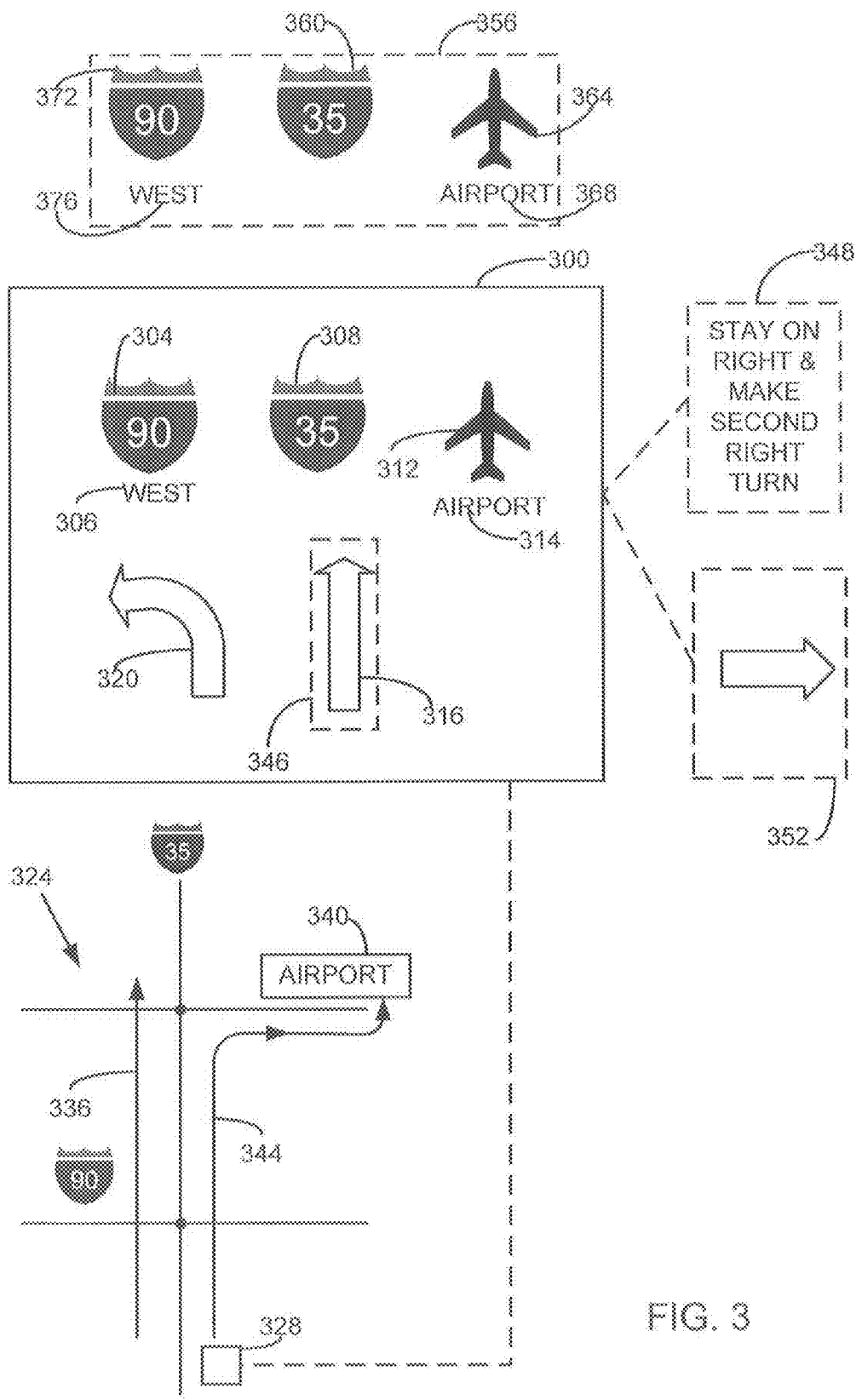
FIG. 3 illustrates one or more embodiments of navigation display features that may be associated with the user device of FIG. 2.

FIG. 3 illustrates one or more embodiments of navigation display features that may be displayed on the display 205 or other displays. A graphical data representation model 300, which may be similar to or different than the graphics model 128, is shown. The graphical model 300 is a data model of a path or road sign, such as a highway or interstate sign. Alternatively, the graphics model 300 may be a data model of any other geographic object. The model 300 is in a vector graphics format, raster or pixel format, video format, animation format, and/or any other graphical format or combinations thereof. In one embodiment, the graphical model 300 and/or components or features thereof is in a single or multi-layered SVG format.

The model 300 includes, but is not limited to, a road symbol or icon 304, text 306, a road symbol or icon 308, a symbol or icon 312, text 314, a direction symbol or icon 316, and a direction symbol or icon 320. More, fewer, or different characters, symbols, icons, labels, text, textual characters, components, and/or features may be provided. In one embodiment, the icon 304 is an interstate or highway 90 symbol (such as a shield symbol), the text 306 is text or characters spelling WEST that is associated with the highway 90 symbol, the icon 308 is an interstate or highway 35 symbol, the icon 312 is a plane symbol for an airport indication, the text 314 is text or characters spelling AIRPORT that is associated with the plane symbol, the direction icon 316 is a straight arrow symbol corresponding to the interstate or highway 35 and designating a direction to follow to go to or stay on highway 35, and the icon 320 is a curved arrow (curving to the left) corresponding to the interstate or highway 90 and designating a direction to follow to go on to the highway 90. Each of these symbols or icons are in a vector graphics format, such as SVG, configured to be selected or identified.

The graphical model 300 may be displayed on a screen, such as the display 205, of a user device to provide navigation functions to a user. In one embodiment, the graphical model 300 is displayed based on a user's or device's position and/or information entered into a routing or navigation application. For example, the model 300 may encompass or cover the entire display screen or be shown without other features (such as a map display or routing display). In such a case, the graphical model 300 may act as the sole navigation interface.

For example, a user may be driving to a destination in which he or she should keep travelling on highway 35. Accordingly, as the user approaches the real world sign (the geographic object the model 300 represents) or a respective junction or intersection, the straight arrow symbol 316 is highlighted or flashes. For example, a highlight or change in appearance 346 is provided. The effect 346 may be a change in brightness, color, or any other graphics effect. In another example, a user may be driving to a destination and may be provided with routing information or guidance. However, the user decides to change his/her plans and instead of making a turn (as the route guidance instructs), the user continues moving straight. The user's navigation system or device starts to recalculate (to generate a new route to the original destination based on the user's position), but the user may touch or select the symbol 346 to indicate that the user wants to go straight and the recalculation stops based on the selection. In yet another example, the user may want to change his or her routing plans and select the airport as a new destination. The user may physically touch the icon 312, text 314, and/or both to select the new destination. Other selection means may be used, such as an electronic mouse, voice recognition, key or keyboard entry, and/or any other input or selection way. After the airport is selected, a symbol 352 may be displayed or provided as guidance. For example, the symbol 352 is an arrow icon (such as in a vector or SVG format) showing the direction the user should go towards to get to the airport. This symbol 352 may be displayed on or over the model 300 or outside/off of the model 300, and any type of graphics effect may be used, such as highlighting or color or brightness change. The symbol 352 may be an animation, video, or any other graphics feature in any format. In addition to or instead of the icon 352, text 348 providing textual guidance instructions may be provided on or off the model 300. For example, the instructions 348 state, "STAY ON RIGHT & MAKE SECOND RIGHT TURN." Alternatively, the instructions 348 are provided in a voice or audio format rather than in text format. Or, both text and audio may be provided.

In another embodiment, a map display or route display 324 may be displayed with the graphical model 300. For example, the map display 324 shows a portion of a geographic area in which the user is routing through, such as seen in navigation systems. The graphical model 300 may be displayed within the map display 324. For example, the map display 324 may be a two-dimensional map placing the model 300 in a position where the respective real-world sign is located. Or, the map display 324 may be a 2.5-dimensional/perspective view or a three-dimensional display in which the graphical model 300 appears as a road sign (as it would in the real-world setting). In any case, the graphical model 300 provides the navigation features/functions mentioned above. Furthermore, in addition to or instead of those features, the graphical model 300 may be used to impact the map/route display 324 as well. For example, the map display shows a portion of a route 336 that depicts going straight past highway 90 and continuing on highway 35. If the user decides to select the airport icon 312 and/or airport text 314, as mentioned above, the map display 324 shows a new route or route portion 344 going to the airport 340.

Other embodiments may provide icons 356 that are outside or separate from a geographic object structure. For example, an icon 372 corresponding to the highway 90 symbol, text 376 corresponding to the WEST designation associated with highway 90, an icon 360 corresponding to the highway 35 symbol, an icon 364 corresponding to the plane or airport symbol, and text 368 corresponding to the AIRPORT designation may be displayed or presented outside of any graphical sign structure. In one embodiment, if a sign or geographic object is shown in the map display 324 and the sign visually appears far away, it may be difficult to see or view the writing on the sign. Accordingly, symbols or icons, such as the icons 356 may be shown or displayed outside of the sign or graphical object. For example, a threshold viewing or perspective distance is determined, and the icons 356 are shown outside a geographical structure or background (such as the boundaries or surface of a sign) when the viewing threshold has not been met (e.g., the visual distance of the sign is too far making the sign seem small and difficult to read or interact with the sign structure). When the viewing threshold is met (such as when the graphical display shows the sign at a minimum desired distance and/or at desired dimensions), the icons 356 are displayed within a sign structure, such as shown by the model 300. In an alternate embodiment, icons 356 shown outside a geographic structure or surface may be displayed without displaying a map or routing display, such as the map display 324. In any case, the icons 356 may be selectable or configured to provide navigation features or functions as described above relative to the other icons.

Figure 4:
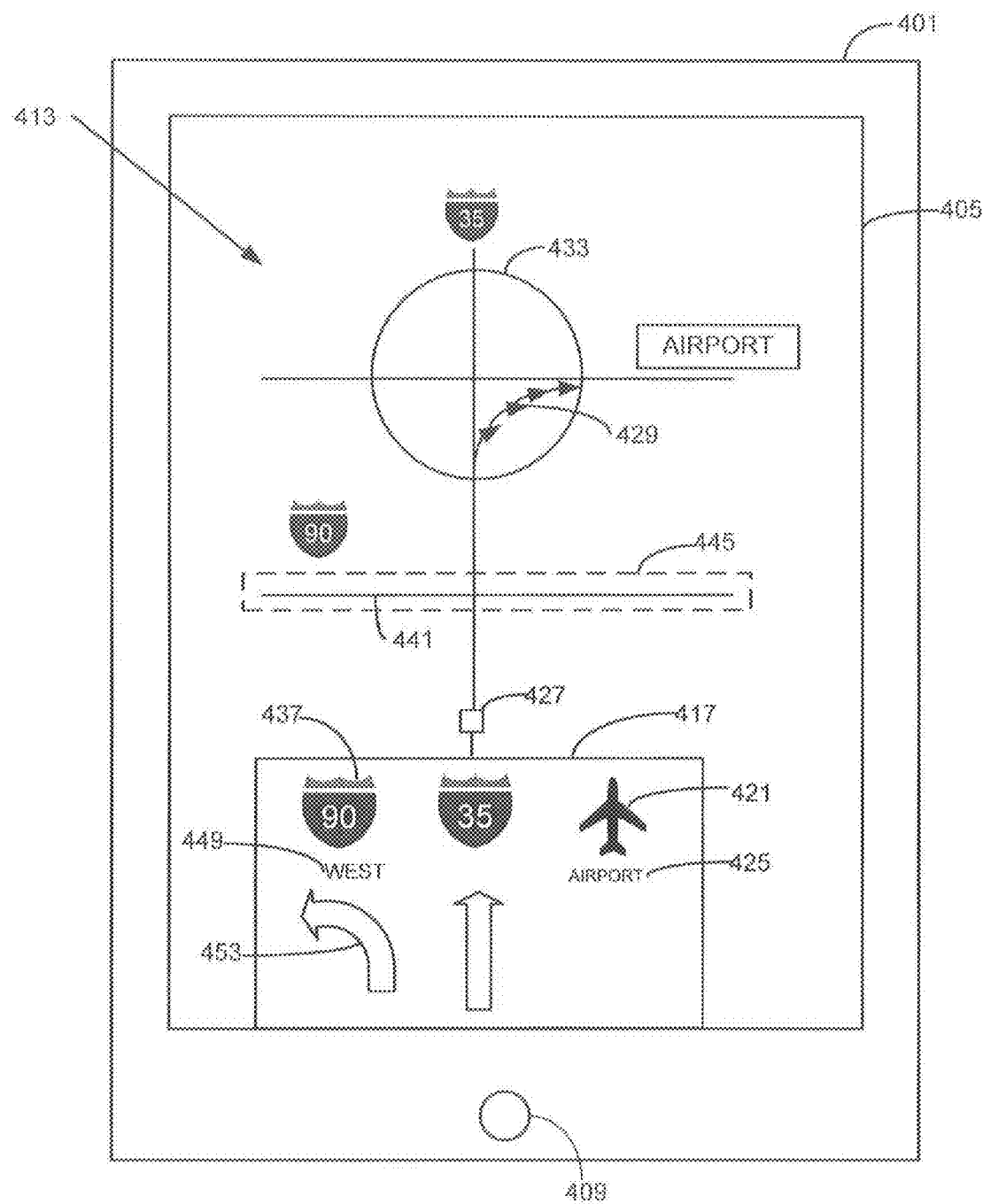
FIG. 4 illustrates an exemplary user device displaying one or more navigation features.

FIG. 4 illustrates an exemplary user device 401. The user device may be similar to or different than the user device 160 and/or 201. In one embodiment, the user device 401 includes, but is not limited to, a screen or display 405 (which may be similar to or different than the display 205) and an input device or button 409 (which may be similar to or different than the input device 225). More, fewer, or different components may be provided. For example, the user device 401 is configured to provide navigation-related functions, such as via a navigation application and associated geographic data. The user device 401 may receive navigation data, logic, features, display items, and/or other information via a wireless or wired connection (such as in a server based operation), or the user device 401 may include or has stored data/logic to perform such operations (or, there may be combination of locally stored data/logic and remote operations).

In one embodiment, the user device 401 displays or presents a navigation, map, and/or geographic scene or display features 413 to an end user (such as via the display 405). The map or navigation window 413 includes a map or routing map of a geographic area as well as graphic model 417 representing a geographic object, such as the model 128 and/or 300.

For example, the graphical model 417 is a data graphics model of a road sign, which is the same or similar to or different than the model 300. The graphical model 417 is positioned at a bottom of the displayed map, but the model may be placed anywhere else in any orientation. The model 417 includes a sign boundary or background illustrating a structure of a sign, a road icon 437 (which is similar to or the same as the icon 304), text 449 (which is similar to or the same as the text 306), a direction icon 453 (which is similar to or the same as the icon 320), an icon 421 (which is similar to or the same as the icon 312), text 425 (which is similar to or the same as the text 314), as well as other icons and/or symbols. More, fewer, or different components or features may be provided.

In one embodiment, the interactive model 417 may provide the same, similar, and/or additional features as the model 300. For example, a user wants navigation or routing information and may enter data to receive such information. In one instance, the user enters an origin point and a destination point to obtain a route between the two as well as one or more associated map displays. Alternatively, the device 401 uses positioning equipment to determine the origin point. The user may be at a location separate or different from the location(s) displayed in the map or navigation display 413. Or, the user may be travelling in or near the displayed areas, and tracking or position information is used to keep the display features current for navigation purposes. For example, the icon 427 may be a representation of where the user is along the route (such as a vehicle icon). Alternatively, the icon 427 may represent where the sign represented by the model 417 is located relative to the map.

The user is presented with the graphics sign or model 417 to aid in navigation functions or features. For example, the user may select the airport icon 412 and/or associated text 425 to route or re-route to the airport. This selection results in a maneuver graphics 429 being provided or displayed. The maneuver 429 is a series of arrows showing a right turn going towards the airport, and the maneuver may be highlighted by a circle or boundary 433. Any other graphics or graphics effects (e.g., an animation, such as showing the arrow(s) moving or curving to the right) may be used to display the maneuver 429 and/or the highlight 433. Also, fewer features or graphics may be provided (such as one curved arrow without a highlight or circle).

Also, the user may select or touch the road icon 437 to highlight a road or road portion 441. The road representation 441 corresponds to or represents highway or interstate 90, and a user can use the sign model 417 to view a highlight 445 that makes the highway 90 conspicuous on the map display. Any type of graphics highlighting may be used. Also, the user may select text 449 to highlight the left or west portion of the displayed highway 90. Furthermore, the user may select the arrow icon 453 to change the route or a portion of the route (such as an intermediate frolic or departure) to go onto highway 90. For example, by selecting the icon 453, the navigation application may provide guidance or instructions to the user on how to merge onto highway 90 WEST, and then from there the application may provide directions or guidance on how to go to the original destination or a different selected destination. Or, selection of arrow 453 may highlight the exit, turn maneuver, and/or road section (such as the left or west side of highway 90 and/or other roads/paths) displayed that is associated with such a turn. Accordingly, the model 417 is used to provide enhanced and advantageous navigation/geographic features.

Figure 5:
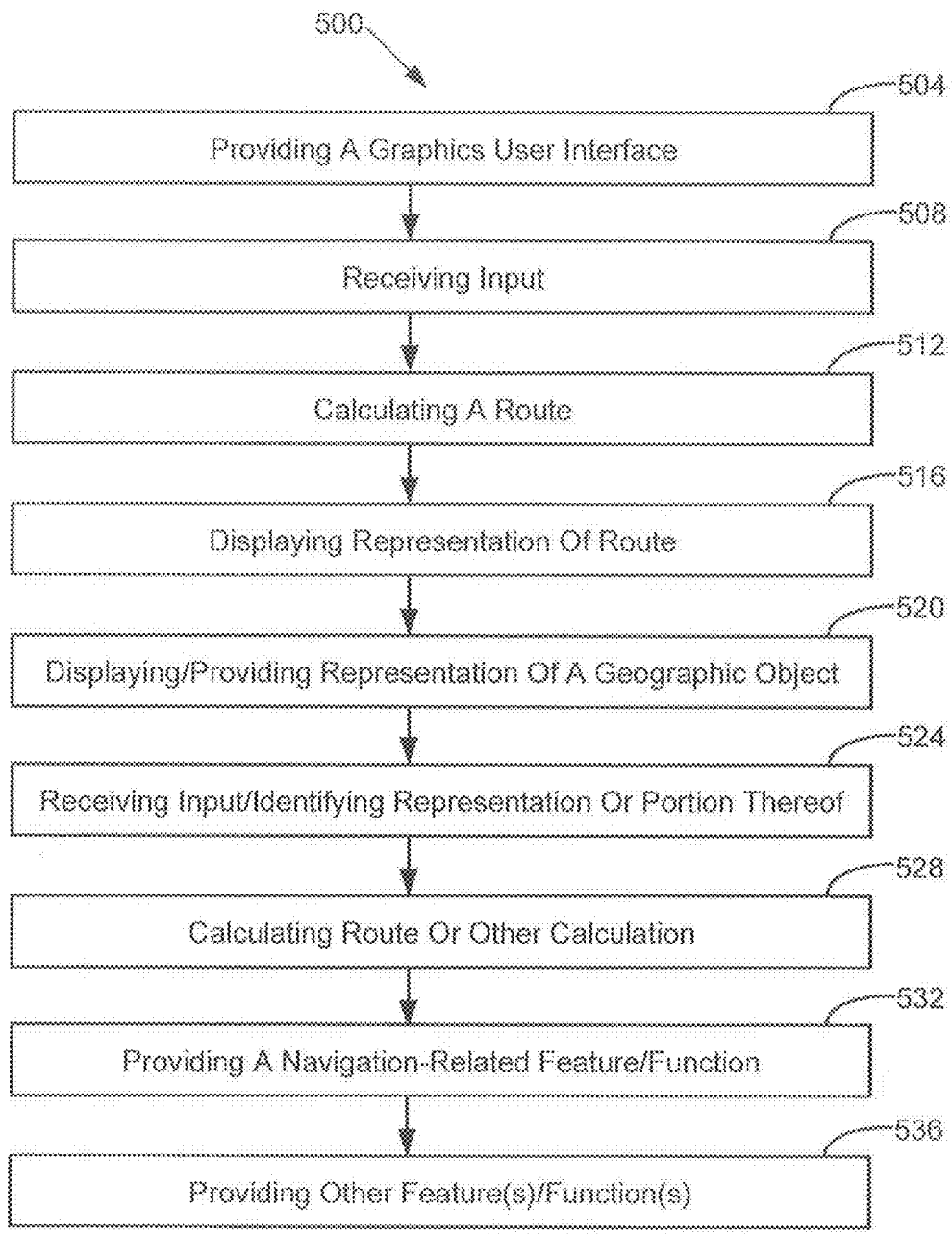
FIG. 5 is a flowchart of an exemplary method of operation of a navigation system.

FIG. 5 is a flowchart of an exemplary method 500 of operation of a navigation system. Fewer, more, or different steps or acts may be provided, and a combination of steps may be provided. Also, the steps or acts may be performed in the order as shown or in a different order. The method is implemented by the system and/or devices described herein or by different devices or systems. One or more steps or processes of the method may be fully or partially automated (such as via a computer, processor, and/or algorithm).

In one embodiment, a graphics user interface is provided (Step 504). For example, a hardware implementation of a display, such as the display 205 and/or 405, of a user device (such as the user device 160, 201, and/or 401) is provided to and/or used or operated by an end user. The display may be a part of a computer, cell phone, PDA, digital tablet, and/or any other device the user chooses to use. In addition to or instead of a hardware implementation, the provided graphics user interface may be a software implementation, such as the user interface 413 or data features shown in FIG. 3. The software implementation may be provided by a map developer (such as the map developer 120), a service provider, the device, and/or other source.

The graphics user interface and/or device thereof receive one or more inputs (Step 508). In one embodiment, an end user uses a device (such as the device 160, 201, and/or 401) for navigation-related purposes. The user may want to route from one point (such as an origin) to another point (such as a destination) or perform other navigation or map functions. In such a case, a user enters a destination location via one or more input devices, such as the input device 225 and/or 409. An origin point may also be inputted by the user or inputted/received by the device via positioning equipment (such as GPS components). Other inputs, such as specific places, coordinates, and/or other geographic, preference, and/or personal information may be entered.

A route or other feature is calculated, determined, and/or identified, such as based on the received input (Step 512). For example, the device or program thereof uses the origin point information and the destination point information to calculate a navigation route between the at least two points. An A-star routing algorithm or any other known or future routing algorithm may be used to calculate the route. Geographic data, such as nodes, segments/links, POI data, and/or associated or other geographic data (such as in the database 132 or other database) is used when determining the route.

A representation of the calculated route (or other feature) or a portion thereof is displayed (Step 516). For example, after and/or during route calculation, one or more images or graphics of the route or portion of the route are displayed on a display (such as the display 205 and/or 405), such as for map display or other navigation purpose. Geographic records, such as map display geographic data in the database 132 or other database, may be used to perform the display function. Any known or future display software, logic, and/or methodologies may be used. The displayed route or portion thereof may be in a vector graphics format, a raster or pixilated format, a tile format, and/or in any other image or graphics format.

One or more representations of geographic feature(s) or object(s) (such as the models 128, 300, and/or 417) are displayed or provided (Step 520). For example, a graphical model of a sign or other geographical feature that can be interacted with for navigation, map, and/or geographic functions is displayed along with or without a display of the calculated route (or a portion thereof) or other map feature. In one embodiment, after the route is calculated, an interactive sign model, such as the graphics model 128, 300, and/or 417, is displayed or presented on the display for navigation and/or guidance purposes. The graphics model may be displayed in such a way that it encompasses the entire screen or may displayed without any other map, geographic, and/or navigation components or scenes. Alternatively, the graphics model may be displayed along with a route display. The sign model may be placed within a geographic scene, such as by the side of a road or the route in a two-dimensional, 2.5-dimensional, and/or three-dimensional setting. For example, coordinate associations, map matching, geo-coding, and/or retrieving data from look-up tables, indexes, or data records may be used to provide or display the graphics model in the appropriate location (e.g., image location) relative to a geographic/graphics scene, and the appropriate location corresponds to a respective real-world location of the object represented by the graphics model. The retrieval of data of the graphics model may be based on position information (such as substantially real-time or inputted position data of the user) and/or links or access to data records, such as link and node data records corresponding to the graphics model or the real-world object represented by the graphics model. Alternatively, the sign model or other model may be placed in any other place, position, or orientation within a graphics scene. Also, instead of placing the graphics model within a geographic display scene, a map or routing information may be associated with the graphics model. For example, in a separate window or the same window a routing map may be displayed for guidance.

The graphics or sign model (or portions thereof) is associated with, stored in, or linked to (e.g., via one or more indexes, look-up tables, storage associations, and/or other means) geographic data, such as data in the database 132 or other database. Accordingly, when a route or other feature is calculated or determined, road or link data, node data, POI data, coordinate, and/or other data may be retrieved or analyzed to determine whether or not to display or provide the graphics model. For example, when the route is calculated, it is determined if a road sign model (representing a real-world sign along the road) is associated with one or more road segments/links, nodes, intersections, POIs, coordinates, etc., and if it is determined that the road sign model is associated with a road of the calculated route (that may or may not be displayed), the road sign model or data thereof is retrieved and displayed.

Alternatively, one or more specific components, symbols, labels, characters, text, and/or features of the interactive geographic model may be displayed without an underlying geographic feature structure, body, and/or dimensions. For example, if a road sign is displayed within a geographic scene, and the size of the sign (based on a perspective distance away) is a size that is not befitting to include interactive features within the body of the sign, then interactive components or features within the graphics sign (such as the icons 356) may be displayed outside the sign body or structure. Also, the body or structure of the graphics sign may not be displayed at all. The determination of when to display only components of the sign or geographic object outside or without a sign or geographic object structure depends on a perspective distance and/or display size of the sign or geographic feature. For example, a threshold perspective distance is determined, and if the graphics sign or model is beyond the threshold perspective distance (meaning the sign appears far away beyond a specified relational point), then the components of the model will be displayed outside a graphics structure of the object or sign. However, if the graphics sign or model is within the threshold perspective distance, then the components will be shown within a graphics structure or body, such as in the model 300. Also, size of the graphics model may be the determining factor. For example, if the display size of the graphics model is below a specified size, then the components of the model will be shown outside of the model, and if the graphics model is above the specified size, then the components of the model will be shown within the model. The threshold perspective distance, specified size, and/or any other determining factors may be predetermined (e.g., and may not be able to be changed) and/or may be configurable by a user.

The graphics model (such as the model 128, 300, and/or 417) or a portion thereof is identified and/or one or more inputs are received identifying the graphics model or portion thereof (Step 524). For example, a user views the graphics model with or without other map or navigation features/components and decides to use the interactive graphics model for navigation or geographic functions. In one embodiment, the graphics model is a graphical representation of a road sign or other geographic object, such as in a vector graphics format (e.g., SVG), raster image format, and/or other graphics format. There are one or more symbols, labels, characters, text, and/or other components on or in the graphics model that are selectable. The user touches, selects, and/or identifies one or more components (such as via one's finger touching a display area or via another input device, like the input device 225) for various functions. In the case of an SVG or vector model, components are selectable (such as via graphical associations with one or more respective XML files), and selected/identified components are associated (in substantially real-time or via stored associations) with information (such as geographic data), features, and/or functions. In the case of a raster or pixilated model (including a video or video model), specific areas or components represented in one or more images may be associated with a bounding box (e.g., a pixilated or raster image of a sign with an airport symbol may have a bounding box associated with or surrounding the displayed image representation of the airport symbol, and so one can select the airport symbol via the bounding box), and the bounding box is associated with information (such as geographic data), features, and/or functions. Or, one or more pixels are specifically associated with information (such as geographic data), features, and/or functions. Or, recognition techniques may be used to identify shapes, text, characters, objects, etc., and then logic is used to link or associate an identified object(s) or content with data and/or function(s).

A route or other calculations/functions are calculated or determined based on the received input (Step 528). For example, when a user touches, clicks on, or selects a component on the graphic model, an associated function (such as via an algorithm) is calculated. The link or tie between a selected component and associated function may be based on predetermined associations, logical associations, ASCII coding, indexing, real-time associations, and/or other identification, selection, or retrieval techniques. Symbols, characters, text, arrows, and/or other components on the graphics model may be selected or identified for highlighting, instruction, routing, map display, animation, video, maneuver, and other purposes. For example, when a component is selected, associated data (such as geographic data) is retrieved and used for calculation or information providing functions (e.g., if text is selected, the text is read (such as by character recognition or other recognition technique) to identify what it is or the text is already associated with a set of information/function(s) without having to be read, and specific data is retrieved to perform a predetermined function/feature). In one embodiment, a route may be calculated, a graphics feature may be created, determined, and/or set, a video or animation may be created, accessed, played, and/or initialized, text or audio may be generated, and/or other calculations, determinations, and/or preparations may be made. Also, the calculation step 528 may be part of the providing step 532 described below.

One or more navigation-related, map-related, and/or geographic-related functions and/or features are provided, such as based on the calculation and/or determination (Step 532). For example, animations, text, voice, highlighting effects, additional map windows, existing map features, and/or other graphics or features may be used to provide navigation-related or map-related functions/features on a display, such as the display 205 and/or 405. In one embodiment, graphics for a route or reroute (or a portion thereof), for highlights, for text or instructions, for maneuvers, for arrows, or other features may be provided for display on the graphics model, off the graphics model, on a map display, and/or on or in combinations thereof, such as those described in regards to FIGS. 3 and 4.

One or more other functions/features may be provided, such as based on received input (Step 536). For example, advertising, location based advertising, other location based services, traffic information (such as traffic display(s) or travel time description(s)), traffic services (such as using RDC-TMC codes and/or other traffic data or information), and/or other features or functions may be calculated and/or provided based on a graphics model and selections thereof described herein. In one embodiment, a user may be provided with one or more advertisements of goods and/or services (e.g., offer of price or reduced price, deal, coupon, etc.) after selecting one or more components in the graphical model. The advertisement may be a raster image, vector based image, video, photograph, animation, and/or any other digital or image advertisement (or the advertisement may be a text/textual ad and/or audio ad). In one example, if a user selects a symbol associated with the graphical model for rerouting purposes, the device or application thereof may provide the user with a digital advertisement about a place, POI, or service in the area along or towards the rerouted direction or at the destination. Also, if a user selects a destination component, like a symbol of a restaurant or an airport on a graphical model of a sign, the user may receive an electronic advertisement (and/or coupon) for a price discount or deal associated with that destination (e.g., it may be for that specific place (such as a restaurant) or any other affiliated place (such as affiliated restaurants)). Any other advertisements may be associated with any symbol, character, text, component, and/or associated navigation feature/component of the graphical model. The advertisements or contents thereof may be served, provided, and/or generated based on location (such as location of the device or user thereof). For example, an advertisement database is queried based on coordinate or position data after selection or identification of the graphical model or portions thereof. Furthermore, identification or selection of one or more components of a graphics model may result in displaying or providing traffic updates, traffic congestions maps, traffic reports, and/or traffic information related to geographic areas or objects associated with the respective selected component (e.g., if a user selects a road symbol or a destination icon, then traffic information (such as substantially real-time traffic information) regarding traffic on a road or portion thereof associated with the road symbol or traffic getting to the destination associated with the icon is provided.

The features, components, devices, systems, acts, steps, and/or processes mentioned herein may be mixed and matched to provide other systems and methods embodying the idea(s) disclosed.

Alternatives

The embodiments described herein regarding the geographic model mainly focus on signs or road signs. In other embodiment, the geographical model may be any other geographic object, such as a building, landmark, billboard, natural structure, vegetation, plant, tree, body of water, road surface, road element, sky, window, and/or any other man-made or natural geographic object. All of the features and functions described herein may apply to any geographical model representing any of these or other geographic objects/features.

Furthermore, in an alternative system, the interactive features, components, and/or functions may be displayed or placed on real-world geographic objects. For example, a real-world path or road sign may include a digital touch screen or display that is selectable (e.g., the surface or face of the sign is a digital display showing components (such as text or symbol(s)) of the sign, as representing a standard or common sign). The components or features of the sign would be interactive as described above. A user can walk up or drive up to this sign to view navigation features/functions, such as directions, routing, highlights, instructions, and/or other graphics features/functions, similar to or different than the ones described above. Real-world geographic objects other than signs may also be used.

Also, a graphical model and features thereof may be used or interacted with via augmented reality. For example, a user may view a real-world sign via a device, and on the screen or display of the device, an image of the sign will appear in an augmented reality application. Accordingly, the selection of components of the sign may occur via augmented reality. In one embodiment, the user touches or selects an airport symbol in an image of the sign that is displayed on his/her device via the augmented reality application, and based on the selection, the user is provided with a route to the airport. Other features and functions regarding an interactive graphics model, as described above, may be used in such an augmented reality application or program.

The logic, data, software, or instructions for implementing the systems, processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or computer-executable instructions stored in or on computer readable storage media (such as non-transitory media). The functions, acts or tasks may be independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method comprising:
receiving, on a graphical user interface, a first user input for a destination;
calculating a first route from an origin to the destination;

displaying a representation of the first route on the graphical user interface;
displaying, on the graphical user interface, an interactive sign icon representative of a real world sign from alongside a first road of the first route from the origin to the destination, wherein the interactive sign icon includes a representation of a second road that leads to the destination;
receiving, on the graphical user interface, a second user input for the interactive icon representative of the real world sign;
calculating a second route to the destination including the second road from the interactive sign icon, wherein the second route is an alternative route to the destination; and
displaying the second route on the graphical user interface.

2. The method of claim 1, wherein the interactive sign icon includes a scalable vector graphics image.

3. The method of claim 1, further comprising:
accessing secondary information based on the second route to the destination or based on the second user input for the interactive icon representative of the real world sign; and
displaying the secondary information on the graphical user interface.

4. The method of claim 3, wherein the secondary information includes traffic information.

5. The method of claim 3, wherein the secondary information includes location based advertising.

6. The method of claim 1, further comprising:
calculating a perceived distance of the real world sign; and
selecting a position for the interactive sign icon or characters for the interactive sign icon as a function of the perceived distance.

7. The method of claim 6, wherein the real world sign comprises a highway or interstate sign located along the first road, and wherein the interactive sign icon represents the highway or interstate sign with a highway or interstate symbol and text associated with the highway or interstate symbol.

8. The method of claim 1, further comprising:
determining when an end user of the graphical user interface is approaching the real world sign, wherein the interactive sign icon is displayed in response to the end user is approaching the real world sign.

9. The method of claim 1, wherein the second road that leads to the destination is not a point of interest or an intermediate destination between the origin and the destination.

10. A method comprising:
receiving, on a graphical user interface, at least a first user input for a destination;
calculating a first route from an origin to the destination;
displaying a representation of the first route on the graphical user interface;
displaying, on the graphical user interface, an interactive sign icon representative of a real world sign for an exit from a road of the first route from the origin to the destination, wherein the interactive sign icon includes a representation of the exit from the road that leads to the destination;
receiving, on the graphical user interface, a second user input for the interactive icon representative of the real world sign;
calculating a second route to the destination including the exit from the road from the interactive sign icon, wherein the second route is an alternative route to the destination; and
displaying the second route on the graphical user interface.

11. The method of claim 10, wherein the interactive sign icon includes a scalable vector graphics image.

12. The method of claim 10, further comprising:
accessing secondary information based on the second route to the destination or based on the second user input for the interactive icon representative of the real world sign; and
displaying the secondary information on the graphical user interface.

13. The method of claim 10, further comprising:
calculating a perceived distance of the real world sign; and
selecting a position for the interactive sign icon or characters for the interactive sign icon as a function of the perceived distance.

14. The method of claim 10, wherein the real world sign comprises a highway or interstate sign located along the road, and wherein the interactive sign icon represents the highway or interstate sign with a highway or interstate symbol and text associated with the highway or interstate symbol.

15. The method of claim 10, further comprising:
determining when an end user of the graphical user interface is approaching the real world sign, wherein the interactive sign icon is displayed in response to the end user is approaching the real world sign.

16. The method of claim 10, wherein the exit from the road that leads to the destination is not a point of interest or an intermediate destination between the origin and the destination.

17. A method comprising:
receiving, on a graphical user interface, at least a first user input for a destination;
calculating a first route from an origin to the destination;
displaying a representation of the first route on the graphical user interface;
calculating a distance to a real world sign alongside a first road;
displaying, on the graphical user interface and based on the distance to the real world sign, an interactive sign icon representative of the real world sign, wherein the interactive sign icon includes a representation of a second road or exit from the first road that leads to the destination;
receiving, on the graphical user interface, a second user input for the interactive icon representative of the real world sign;
calculating a second route to the destination including the second road or the exit from the first road from the interactive sign icon, wherein the second route is an alternative route to the destination; and
displaying the second route on the graphical user interface.

18. The method of claim 17, wherein the interactive sign icon includes a scalable vector graphics image.

19. The method of claim 17, further comprising:
accessing secondary information based on the second route to the destination or based on the second user input for the interactive icon representative of the real world sign; and
displaying the secondary information on the graphical user interface.

20. The method of claim 19, wherein the secondary information includes traffic information.

21. The method of claim 17, wherein the real world sign comprises a highway or interstate sign located along the first road, and wherein the interactive sign icon represents the highway or interstate sign with a highway or interstate symbol and text associated with the highway or interstate symbol.

22. The method of claim 17, further comprising:
determining when an end user of the graphical user interface is approaching the real world sign, wherein the interactive sign icon is displayed in response to the end user is approaching the real world sign.

23. The method of claim 17, wherein the second road or exit from the first road that leads to the destination is not a point of interest or an intermediate destination between the origin and the destination.

24. A non-transitory computer-readable medium configured to store a computer program that performs a method of providing navigation related functions, the method comprising:
receiving, on a graphical user interface, at least a first user input for a destination;
calculating a first route from an origin to the destination;
displaying a representation of the first route on the graphical user interface;
calculating a distance to a real world sign on a road of the first route;
displaying, on the graphical user interface and based on the distance to the real world sign, an interactive sign icon representative of the real world sign, wherein the interactive sign icon includes a representation of an exit from the road;
receiving, on the graphical user interface, a second user input for the interactive icon representative of the real world sign;
calculating a second route to the destination including the exit from the road from the interactive sign icon; and
displaying the second route on the graphical user interface.

25. A navigation system comprising:
a navigation application configured to receive at least a first user input for a destination and calculate a first route from an origin to the destination;
a graphical user interface configured to display a representation of the first route and an interactive sign icon representative of a real world sign from alongside a first road of the first route from the origin to the destination, wherein the interactive sign icon includes a representation of a second road, wherein the second road is part of an alternative route from the origin to the destination;
wherein when the graphical user interface receives a second user input for the interactive icon representative of the real world sign, the navigation application calculates a second route to the destination including the second road from the interactive sign icon.

26. A non-transitory computer-readable medium configured to store a computer program that performs a method of providing navigation related functions, the method comprising:
receiving, on a graphical user interface, at least a first user input for a destination;
calculating a first route from an origin to the destination;
displaying a representation of the first route on the graphical user interface;
displaying, on the graphical user interface, an interactive sign icon representative of a real world sign for an exit from a road of the first route from the origin to the destination, wherein the interactive sign icon includes a representation of the exit from the road, wherein the exit is part of an alternative route from the origin to the destination;
receiving, on the graphical user interface, a second user input for the interactive icon representative of the real world sign;
calculating a second route to the destination including the exit from the road from the interactive sign icon; and
displaying the second route on the graphical user interface.

* * * * *